United States Patent [19]

Keenan

[11] 4,453,746

[45] Jun. 12, 1984

[54] UNIVERSAL FERRULE OR BAND CLAMP HOSE FITTING

[75] Inventor: John R. Keenan, Watertown, N.Y.

[73] Assignee: General Signal Corporation, Stamford, Conn.

[21] Appl. No.: 220,188

[22] Filed: Dec. 23, 1980

[51] Int. Cl.³ .............................................. F16L 33/20
[52] U.S. Cl. .................................... 285/256; 285/253
[58] Field of Search ............... 285/256, 253, 259, 252

[56] References Cited

U.S. PATENT DOCUMENTS

| 487,893 | 12/1892 | Schimper et al. | |
|---|---|---|---|
| 1,015,311 | 1/1912 | Gold | 285/253 X |
| 2,260,454 | 10/1941 | Hedeman | |
| 2,464,416 | 3/1949 | Raybould | |
| 2,522,684 | 9/1950 | Mitchell | 285/259 X |
| 3,243,208 | 3/1966 | Lalikos et al. | 285/259 X |
| 3,521,914 | 7/1970 | Delahunty | |
| 3,610,665 | 10/1971 | Mingo | |
| 3,711,131 | 1/1973 | Evans | 285/259 X |
| 4,226,446 | 10/1980 | Burrington | 285/256 |
| 4,330,142 | 5/1982 | Paini | 285/253 |

FOREIGN PATENT DOCUMENTS 905381 9/1962 United Kingdom ............... 285/256

Primary Examiner—Dave W. Arola
Attorney, Agent, or Firm—Barnes & Thornburg

[57] ABSTRACT

A hose fitting having a stem which includes a recess between a hose stop flange and a bulbous distal end and radial ridges in the recess. The maximum diameters of the ridges are smaller than the maximum diameter of the hose stop flange and the distal end so that a band clamp can be used to secure a hose to the hose fitting. A crimped ferrule fastener includes two beads each traversing a portion of the recess and the hose stop flange or a portion of the bulbous end, respectively.

10 Claims, 5 Drawing Figures

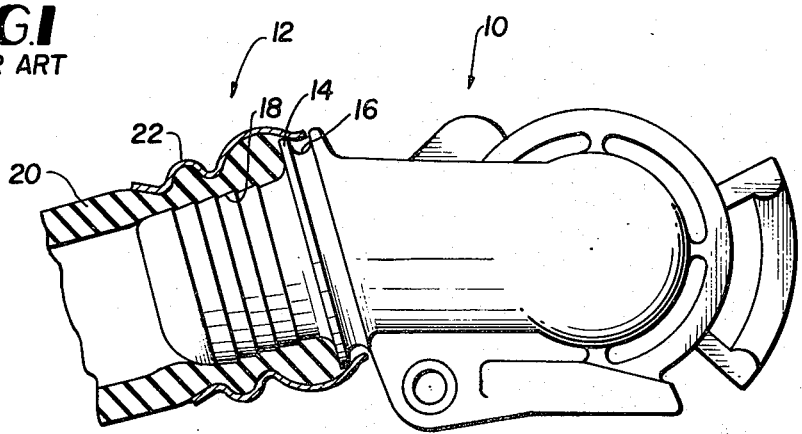
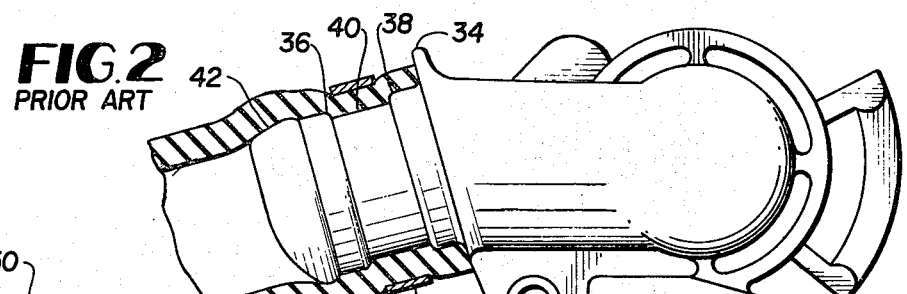
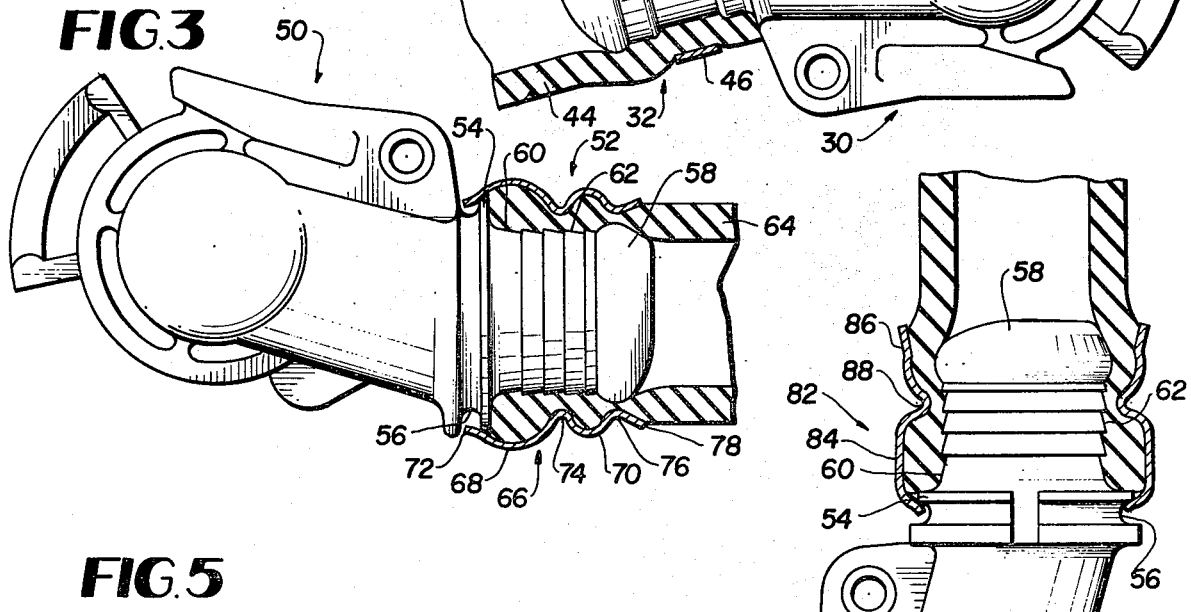
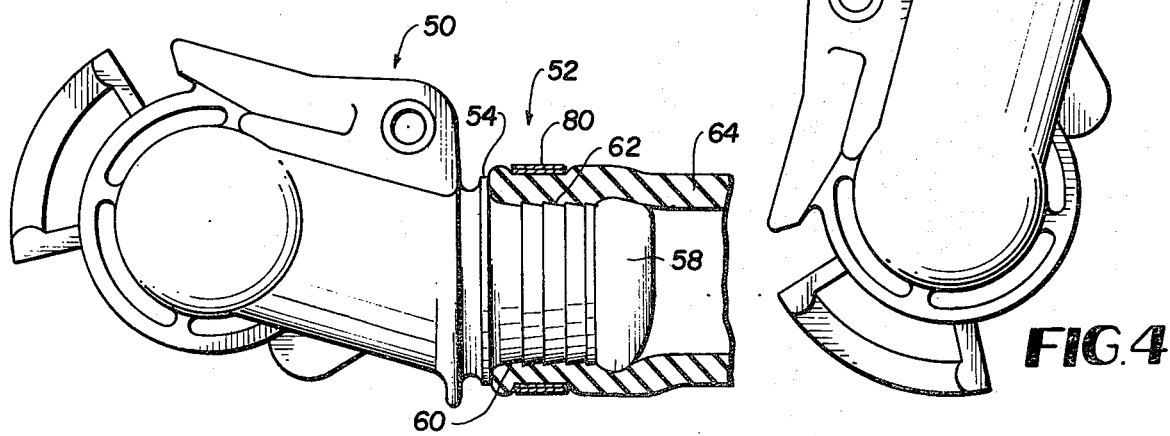

UNIVERSAL FERRULE OR BAND CLAMP HOSE FITTING

BACKGROUND OF THE INVENTION

The present invention relates generally to hose fittings and more specifically to a universal hose fittings.

Presently in the railroad industry there are two types of American Association of Railroads (AAR) approved fittings for airbrake hoses to hose couplings. As illustrated in FIG. 1, the first is a crimped ferrule fitting and the second, as illustrated in FIG. 2, a band clamp fitting. The hose coupling 10 of FIG. 1 includes a stem 12 having a hose stop flange 14 and an annular recess 16 at the proximal end of the stem. A reduced diameter portion includes a plurality of radial ridges 18. The hose 20 is inserted onto the stem abutting the hose stop flange 14 with a ferrule 22 thereon and crimped with one end lying in the annular recess 16. The crimping is performed by a special machine depending upon the design of the stem 12.

Although this design operates satisfactorily, it does not allow for replacement of hoses in the field. The crimped ferrule type fitting normally requires a special, highly priced machine to form the necessary crimping. Accordingly, crimped ferrule-type fittings have to be returned to the maintenance shop to have the new hose crimped thereon. In actuality, what happens is that the maintenance people attempt to secure the hose to the stem using a band clamp. Normally, the band clamp is simply too weak to hold the hose in combination with the specific stem structure 12. Ultimately the hose slips off the fitting thereby necessitates replacement of the hose assembly. Thus time is lost not only because of the extended train delays, but by the requirement to send the hose assembly to a maintenance shop which has the specialized highly priced crimping machine.

The band clamp hose fitting coupling 30 of FIG. 2 includes a stem 32 with a hose stop flange 34. A pair of oppositely facing shoulders 36 and 38 are interconnected by a reduced diameter section to form an annular recess 40. The distal end of the stem 32 includes an enlarged bulbous 42. A those 44 is inserted over the stem 32 to come to rest against the hose stop flange 34. A band clamp 46 is placed over the recess 40 and tightened to secure the hose to the stem.

SUMMARY OF THE INVENTION

An object of the invention is to provide a universal hose fitting which may be used with crimped ferrules as well as band clamps.

Another object of the present invention is to provide a hose fitting with a crimped ferrule type hose fastener which may be replaced in the field with a band clamp fastener.

A still further object of the present invention is to provide a hose fitting with a crimped ferrule type of fastener which may be replaced in the field without the need of special machines or tools.

These and other objects of the present invention are attained by providing a hose coupling with a stem having an enlarged tapered distal end so as to form an annular recess between the distal and proximal ends which includes a plurality of radial ridges therein. An annular recess adjacent the hose stop flange in combination with the radial ridges provides the structure needed for the crimped ferrule type of fastener. The increased diameter distal end in combination with the hose stop flange provides a recess such that the hose may be replaced in the field and secured to the hose fitting by a band clamp fastener. A ferrule is crimped to include a first bead extending from the proximal recess over the stop flange and terminating into the recess below the termination of the portion in the proximal recess and a second bead portion extending from the recess portion over the adjacent portion of the increased distal end and terminating at the maximum diameter of the distal end. Alternatively, the first bead can terminate in the recess adjacent the increased distal end.

Other objects, advantages and novel features of the present invention will become apparent from the following detailed description of the invention when considered in conjunction with the accompanying drawings.

BRIEF DESCRIPTION OF THE DRAWINGS

FIG. 1 is a plan view of a crimped ferrule type hose fitting of the prior art.

FIG. 2 is a plan view of a band clamp type fitting of the prior art.

FIG. 3 is a plan view of a hose fitting incorporating the principles of the present invention with a crimped ferrule type fastener.

FIG. 4 is a plan view of the hose fitting of the present invention with another crimped ferrule type fastener.

FIG. 5 is a plan view of the hose fitting of the present invention with a clamp band type fastener.

DESCRIPTION OF THE PREFERRED EMBODIMENTS

As illustrated in FIGS. 3, 4 and 5, the hose fitting 50 has a stem 52 which includes a hose stop flange 54 and a proximal annular recess 56. The distal end of the stem 52 includes a tapered portion 58 which is illustrated as a bulbous shape. Between the distal bulbous 58 and the stop flange 54 is a reduced diameter section or recess 60. A plurality of radial ridges 62 are spaced axially along the length of the recess 60. The ridges 62 have a truncated conical shape tapering from a base towards the distal end of the stem. Obviously other shaped ridges may be used, but this has been found to be the most efficient in retaining the hose on the hose fitting. Similarly, the bulbous shape of distal end 58 has been found to be most efficient although other types of tapered ends can be used as long as the largest diameter of the tapered end 58 is greater than the largest diameter of the ridges 62 so as to form the recess 60 between the distal end 58 and the hose stop flange 54 at the proximal end.

As illustrated in FIG. 3, the hose 64 is inserted on the stem 52 with its end abutting the hose stop flange 54. The ferrule 66 is concentric to the hose 64 and the stem 52. The ferrule 66 is crimped to form two bead portions 68 and 70. The first bead portion 68 has one end in the proximal recess 56 adjacent the hose stop flange 54, extends over the hose stop portion 54 and adjacent portions of the recess 60 and terminates at a second end 74 in the recess 60 above the radial ridges 62. The termination 74 has a smaller diameter than the termination at 72 and the termination 72 has a smaller diameter than the outside diameter of the hose stop flange 54.

The second bead portion 70 of the crimped ferrule 66 also has the crimped termination 74, extends over adjacent portions of the recess 60 and the bulbous end 58. Likewise, as shown in FIG. 3, bead portions 68 and 70 may have a common end at termination 74. The termination 76 of the bead 70 is concentric to the maximum diameter portion of the bulbous end 58. The remainder of the crimped ferrule 78 flairs outward from the termination 76. This prevents the termination of the second bead from piercing the hose. As is obvious from FIG. 3, the bulbous portion 58 increases the retention of the hose 64 to the stem 52 by the specific formation of the second bead 70 with the termination 76 concentric to the maximum diameter of the bulbous end 58.

An alternate crimped ferrule design is illustrated in FIG. 4 as a ferrule 82 crimped to have a first and second bead portions 84 and 86. As with the previous design, the first bead portion 84 hs one end in the proximal recess 56 adjacent the hose stop flange 54, extends over the hose stop flange 54 and adjacent portion of the recess 60 and terminates at a second end 88 in the recess 60 above the radial ridges 62. The second bead 86 extends outwardly from the second end portion 88 over adjacent portions of the recess 60 and the bulbous end 58. Since the bulbous end 58 is larger than the recess 60 and the ridges 62, the second crimped termination of the second bead 86 is not needed. To compensate for this lack of second crimped end of the second bead which is 76 in FIG. 3, the first termination 88 is in the recess 60 adjacent the bulbous end 58. Similarly the crimp on termination 88 is deeper than that of 74 of FIG. 3.

The versatility of the fitting is illustrated specifically in FIG. 5 wherein a band clamp type fitting is used with the stem of FIG. 3. If the hose 64 should break or the crimped ferrule 66 should become defective, a replacement of the hose or the fitting may be performed in the field without expensive tools or equipment. A simple band clamp 80 may be used and provided concentric to the hose 64 and the recess portion 60 between the bulbous end 58 and the hose stop flange 54. This structure satisifes the requirements of AAR Spec E-50-76 which the ferrrule-type fitting of the prior art illustrated in FIG. 1 cannot meet. It should also be noted that the plurality of radial ridges 62 provide additional griping compared to the prior art stem illustrated in FIG. 2.

From the preceding description of the preferred embodiments, it is evident that the objects of the present invention are attained in that a new stem is provided on a hose fitting which will meet the AAR standards for a crimped ferrule type fitting as well as a clamp band type fitting. Although the invention has been described and illustrated in detail, it is clearly understood that the same is by way of illustration and example only and is not to be taken by way of limitation. The stem of the present invention may also be used on the hose nipple at the other end of the hose. The spirit and scope of the present invention are to be limited only by the terms of the appended claims.

What is claimed:

1. In a hose fitting for use with another hose fitting to interconnect two hoses and including a stem to be inserted in the end of a hose and a means to secure the hose to said stem, the improvement being said stem which comprises:
   a hose stop means at the proximal end of said stem;
   an enlarged, bulbous tapered means at the distal end of said stem;
   an annular recess between said hose stop means and said bulbous tapered means having sufficient depth so as to permit secure fitting of said hose to said stem by means of a band clamp concentric to said recess only;
   a plurality of radial ridge means spaced axially in said recess and having a maximum diameter sufficient to provide a means for substantially engaging and aiding the securing of said hose when said hose is secured to said stem by a crimped ferrule concentric to said hose stop means and said recess and sufficiently less than the maximum diameter of said enlarged, bulbous tapered means so as to provide means for substantially engaging and aiding in the securing of said hose when said hose is secured to said stem alternatively by said clamp concentric to said recess only; and
   a ferrule concentric to said hose and said hose stop means and said recess for securing said hose to said stem, said ferrule having a first bead extending over said hose stop means and adjacent portions of said recess containing more than one of said ridge means, and a second bead extending over at least that part of said enlarged, bulbous tapered means having the greatest diameter and adjacent portions of said recess; the ends of said first bead both having a smaller diameter than said hose stop means and at least one end of said second bead terminates within said annular recess.

2. The hose fitting according to claim 1 wherein said ridges have truncated conical shape tapering from a base towards the distal end of the stem.

3. A hose and hose fitting comprising:
   a stem portion of said hose fitting positioned interior of said hose;
   a hose stop means at the proximal end of said stem abutting the end of said hose;
   an enlarged, bulbous tapered means at the distal end of said stem interior said hose;
   an annular recess between said hose stop means and said tapered means having sufficient depth so as to permit secure fitting of said hose to said stem portion by means of a band clamp concentric to said recess;
   a crimped ferrule concentric to said hose and said hose stop means and said recess for securing said hose to said stem;
   a plurality of radial ridge means spaced axially in said recess and having a maximum diameter sufficient for engaging and aiding the securing of said hose to said stem by said crimped ferrule and sufficiently less than the maximum diameter of said enlarged tapered means for engaging and aiding the securing of said hose to said stem by a band clamp, concentric to said recess only, when said crimped ferrule is not in use; and
   wherein said ferrule is crimped to form a first bead extending over said hose stop means and adjacent portions of said recess containing more than one of said ridge means, and a second bead extending over at least that part of said enlarged bulbous tapered means having the greatest diameter and ajcent portions of said recess; the ends of said first bead both having a smaller diameter than said hose stop means and at least one end of said second bead lies within said annular recess and adjacent said enlarged, bulbous tapered means.

4. The hose and hose fitting according to claim 3, wherein said hose stop means has a diameter larger than said enlarged bulbous tapered means, and the end of said first bead extending over said recess conicides with the end of said second bead extending over said recess such that each of these ends has the same diameter.

5. The hose and hose fitting according to claim 3, wherein said first bead that extends over said recess terminates adjacent said enlarged, bulbous tapered means.

6. The hose and hose fitting according to claim 3 including a proximal annular recess between said hose stop means and the remainder of said hose fitting and one end of said first bead extends into said proximal annular recess.

7. The hose and hose fitting according to claim 3 wherein the end of said first bead adjacent said those stop means terminates at a diameter larger than the diameter of the termination of the end of said first bead in said recess.

8. The hose and hose fitting according to claim 3 wherein one end of said second bead terminates concentric to the largest diameter portion of said enlarged tapered means.

9. The hose and hose fitting according to claim 8 wherein said ferrule includes a flaired portion extending from the termination of said second bead above said enlarged tapered means.

10. The hose and hose fitting according to claim 3 wherein one end of said first bead terminates in said recess adjacent said enlarged tapered means.

* * * * *